United States Patent [19]

Kamegawa et al.

[11] Patent Number: 5,373,884
[45] Date of Patent: Dec. 20, 1994

[54] PNEUMATIC TIRES WITH SPACED SIDEWALL RECESSES

[75] Inventors: Tatsuhiko Kamegawa, Kodaira; Yukio Nakajima, Akigawa; Tsukasa Haneda, Kodaira, all of Japan

[73] Assignee: Bridgestone Corporation, Tokyo, Japan

[21] Appl. No.: 103,320

[22] Filed: Aug. 9, 1993

Related U.S. Application Data

[63] Continuation of Ser. No. 809,335, Dec. 18, 1991, abandoned.

[30] Foreign Application Priority Data

Dec. 19, 1990 [JP] Japan .................................. 2-412013

[51] Int. Cl.$^5$ .................................................. B60C 3/00
[52] U.S. Cl. ...................................... 152/454; 152/523
[58] Field of Search ............ 152/454, 209 R, 209 WT, 152/523, 524

[56] References Cited

U.S. PATENT DOCUMENTS

| D. 188,746 | 8/1960 | Balmer, Jr. ............... | 152/523 |
|---|---|---|---|
| 1,662,599 | 3/1928 | Brown .................. | 152/454 |
| 3,982,579 | 9/1976 | Mirtain ................ | 152/209 R |
| 4,057,092 | 11/1977 | Tracy . | |
| 4,308,907 | 1/1982 | Monzini ............... | 152/209 WT |
| 5,027,876 | 7/1991 | Chrobak et al. .......... | 152/209 R |

FOREIGN PATENT DOCUMENTS

| 0022085 | 1/1930 | Australia ............... | 152/454 |
|---|---|---|---|
| 0072500 | 2/1983 | European Pat. Off. . | |
| 0685653 | 7/1930 | France ................ | 152/454 |
| 1517850 | 12/1966 | France . | |
| 1586373 | 2/1970 | France . | |
| 0501241 | 11/1954 | Italy .................. | 152/523 |
| 50-48603 | 4/1975 | Japan . | |
| 57-191104 | 11/1982 | Japan . | |
| 0128006 | 7/1985 | Japan ................. | 152/523 |
| 350001 | 3/1991 | Japan . | |
| 374209 | 3/1991 | Japan . | |
| 1275737 | 5/1972 | United Kingdom ....... | 152/523 |

*Primary Examiner*—Michael W. Ball
*Assistant Examiner*—Nancy T. Krawczyk
*Attorney, Agent, or Firm*—Sughrue, Mion, Zinn, Macpeak & Seas

[57] ABSTRACT

A pneumatic radial tire comprises a pair of bead portions, a pair of sidewall portion extending outward from the bead portions in radial direction, and a tread portion between the sidewall portions. In this tire, the sidewall portion ranging from a separation point of the tire from a rim to a tread end is equally divided into three regions, and at least one annular recess extending circumferentially of the tire is formed on an outer surface of each of these regions in the sidewall portion so that a maximum depth of the annular recess is 0.3 times or more of an original rubber gauge at a position corresponding to a deepest point of the annular recess.

5 Claims, 1 Drawing Sheet

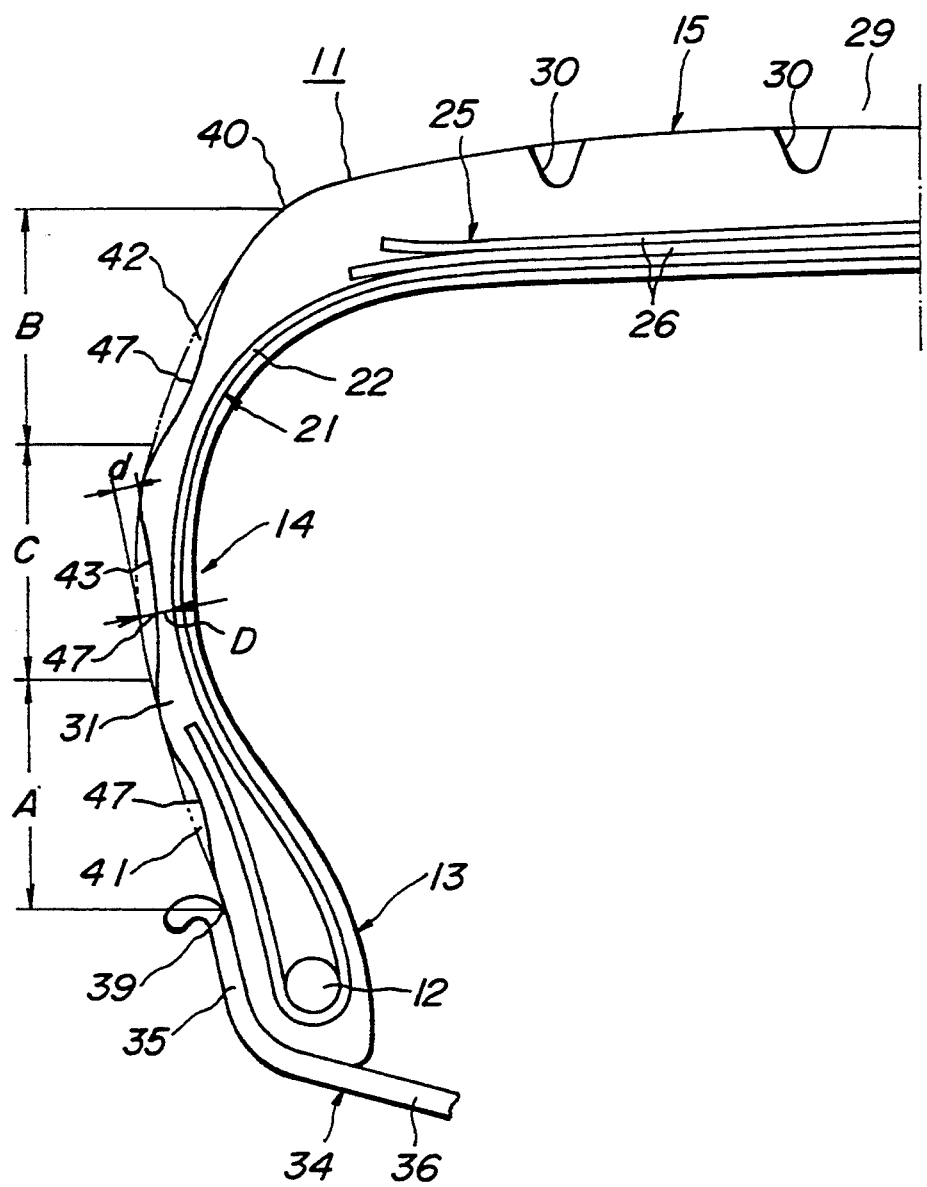
FIG_1

PNEUMATIC TIRES WITH SPACED SIDEWALL RECESSES

This is a continuation of application Ser. No. 07/809,335 filed Dec. 18, 1991, now abandoned.

BACKGROUND OF THE INVENTION

1. Field of the Invention

This invention relates to a pneumatic tire having a rolling resistance reduced by decreasing strain energy loss in a sidewall portion of the tire.

2. Description of the Related Art

In general, when the pneumatic tire is run, the sidewall portion is repeatedly deformed under a load at a ground contact side, during which strain energy such as bending energy, shearing energy and the like are stored in the rubber constituting the sidewall portion (hereinafter referred to as sidewall rubber) by the above deformation. Thereafter, when the sidewall rubber is released from the deformation by shifting from the ground contact side, the aforementioned strain energy is converted into heat energy to bring about useless energy consumption. For this end, the pneumatic tire usually has a large rolling resistance.

Heretofore, there have been various pneumatic tires having a rolling resistance reduced by decreasing strain energy loss in the sidewall portion. For example, it is known that the sidewall rubber is divided into outer rubber layer and inner rubber layer and rubber having a low modulus is used as the inner rubber layer, whereby strain energy loss in the inner rubber layer is reduced to reduce strain energy loss of the sidewall portion as a whole.

In such a conventional pneumatic tire, however, the sidewall portion is rendered into a two-layer structure, so that the tire build-up step becomes complicated and hence the productivity is lowered and the cost of the tire product becomes high.

SUMMARY OF THE INVENTION

It is, therefore, an object of the invention to provide pneumatic tires capable of positively reducing strain energy loss in the sidewall portion though the tire build-up which is easy and the cost is low.

According to the invention, there is the provision of a pneumatic radial tire comprising a pair of bead portions, a pair of sidewall portion substantially extending outward from the bead portions in a radial direction, and a tread portion of substantially cylindrical form connecting radially outward ends of the sidewall portions to each other. The sidewall portion ranging from a separation point of the tire from a rim to a tread end is equally divided into three regions, and at least one annular recess extending circumferentially of the tire is formed on an outer surface of each of these regions in the sidewall portion. A maximum depth of each of the annular recess is 0.3 times or more of an original rubber gauge at a position corresponding to a deepest point of the annular recession.

During the running of the pneumatic radial tire according to the invention, the sidewall portion is repeatedly deformed under a load at a ground contact side. In this case, the annular recess extending circumferentially of the tire are formed on the outer surface of the sidewall portion and the maximum depth of each annular recess is 0.3 times or more of original rubber gauge at a position corresponding to the deepest point of the annular recess, so that the bending rigidity in the vicinity of the deepest point of the annular recess becomes small and hence the deformation produced in the sidewall portion concentrates in the vicinity of the deepest point of the annular recess to decrease the deformation in rubber portion other than the vicinity of the deepest point of the annular recess. Thus, the sidewall portion locally and largely deforms only in the vicinity of the deepest point of the annular recess, while rubber portions located between the deepest points of the annular recesses, between the deepest point of the annular recess and the tread end, and between the deepest point of the annular recess and the separation point from the rim hardly deform, so that total quantity of bending, shearing strain energy and the like stored in the rubber portions becomes less and hence the strain energy loss decreases to reduce the rolling resistance. Furthermore, according to the invention, the sidewall portion ranging from the separation point of the tire from the rim to the tread end is equally divided into three regions in the radial direction and at least one annular recess is formed on the outer surface of each of these regions of the sidewall portion, so that the annular recesses are dispersed substantially uniformly over a whole of the sidewall portion to ensure the decrease of the strain energy loss. Moreover, such an effect is attained only by forming the annular recesses in the sidewall portion, so that the tire build-up is easy and the production cost becomes inexpensive.

BRIEF DESCRIPTION OF THE DRAWING

The invention will be described with reference to the accompanying drawing, wherein:

FIG. 1 is a radial half section of an embodiment of the pneumatic tire according to the invention.

DESCRIPTION OF THE PREFERRED EMBODIMENTS

In FIG. 1, numeral 11 is a pneumatic radial tire according to the invention. The tire 11 comprises a pair of bead portions 13 each containing a bead core 12 embedded therein, a pair of sidewall portions 14 extending outward from the bead portions 13 in the radial direction of the tire, and a tread portion 15 of substantially cylindrical form connecting outer ends in radial direction of these sidewall portions 14 to each other. Further, the tire 11 is reinforced with a carcass 21 toroidally extending from one of the bead portions 13 to the other bead portion 13. The carcass 21 is comprised of at least one carcass ply 22 (one ply in the illustrated embodiment). The carcass ply 22 is wound around the bead core 12 from inside of the tire toward outside thereof to form a turnup portion. A belt 25 comprised of at least two belt layers 26 is arranged on a crown portion of the carcass 21 outside thereof in the radial direction of the tire. A tread rubber layer 29 is provided at its outer surface with grooves 30 such as circumferential main grooves, lateral grooves and the like is disposed on the outside of the belt 25 in the radial direction and a sidewall rubber layer 31 is disposed on the outside of the carcass 21 in the axial direction of the tire. Numeral 34 is a rim having a rim flange 35 at its both ends in the axial direction and mounting the tire 11. Moreover, the bead portion 13 of the tire 11 is seated on a bead seat 36 of the rim 34.

According to the invention, the sidewall portion 14 ranging from a separation point 39 of the tire 11 from the rim 34 to a tread end 40 is equally divided into three regions in the radial direction, i.e. an inner region A located inward in the radial direction, an outer region B located outward in the radial direction and a middle region C located between the regions A and B. At least one annular recess 41, 42, 43 continuously extending circumferentially of the tire is formed on an outer surface of each of these regions A, B, C in the sidewall portion 14 (one annular recess in each region in the illustrated embodiment). Each of these annular recess 41, 42, 43 has a deepest point 47 viewed from a section in the widthwise direction. A depth of each of these annular recesses 41, 42, 43 gradually changes in the radial direction (widthwise direction of the annular to provide each recess with a smooth gradually curved surface in the radial direction recess) and also these annular recesses 41, 42, 43 are arranged at approximately equal interval in the radial direction, so that the outer surface of the sidewall portion 14 as a whole is rugged in a wavy form. A maximum depth d of each of the annular recesses 41, 42, 43 is 0.3 times or more of original rubber gauge D at a position corresponding to the deepest point 47 of these recesses. The term "original rubber gauge" used herein means a rubber gauge of the sidewall rubber layer containing no annular recess which is a shortest distance from the outer surface of the sidewall portion up to the outer surface of the carcass ply embedded in the tire 11. Thus, when the annular recesses 41, 42, 43 are formed in the outer surface of the sidewall portion 14 in such a manner that the maximum depth d of the recess is 0.3 times or more of the original rubber gauge D, the bending rigidity in the vicinity of the deepest points 47 of the annular recesses 41, 42, 43 becomes small and hence the deformation produced in the sidewall portion 14 during the running of the tire 11 under a load concentrates in the vicinity of the deepest points 47 of the annular recesses 41, 42, 43 to decrease the deformation of the sidewall rubber layer 31 other than the portions corresponding to the deepest points 47 of the annular recesses 41, 42, 43. That is, the sidewall portion 14 is locally and largely deformed only in the vicinity of the deepest points 47 of the annular recesses 41, 42, 43. It and is hardly deformed in portions of the sidewall rubber layer 31 located between the deepest points 47 of the adjoining annular recesses, between the deepest point 47 of the annular recess 42 and the tread end 40, and between the deepest point 47 of the annular recess 41 and the separation point 39. The result is that total quantity of bending and shearing strain energies and the like becomes less and consequently the strain energy loss is decreased to reduce the rolling resistance. Furthermore, the annular recesses 41, 42, 43 are formed on the outer surfaces of the regions A, B, C in the sidewall portion 14 as previously mentioned, so that the annular recesses 41, 42, 43 are dispersed substantially uniformly over a whole of the sidewall portion 14 in the radial direction to ensure the decrease of the strain energy loss.

When the maximum depth d is less than 0.3 times of the original rubber gauge D, the deformation hardly concentrates in the vicinity of the deepest points 47 of the annular recesses 41, 42, 43 and hence the effect of reducing the rolling resistance can not be expected, so that the maximum depth d should be 0.3 times or more of the original rubber gauge D. Moreover, when the maximum depth d exceeds 0.7 times of the original rubber gauge D, the sidewall portion 14 is excessively bent at the deepest points 47 of the annular recesses 41, 42, 43 and hence wrinkles or cracks are apt to be caused in the deepest points 47, so that the maximum depth d is preferably not more than 0.7 times of the original rubber gauge D.

In order to sufficiently develop the aforementioned effect, it is preferable to arrange 3 to 6 annular recesses per 10 cm of a distance in the radial direction of the tire. Furthermore, such an effect is attained only by building up the tire through, for example, vulcanization, so that the build up of the tire 11 becomes easy and also the production cost becomes expensive.

The invention will be described with respect to the following test below.

In this test, there were provided a conventional tire having no annular recess in the sidewall portion, a comparative tire 1 in which each of the regions A, B, C in the sidewall portion as shown in FIG. 1 contains one annular recess so as to have a ratio d/D of 0.20, a comparative tire 2 in which each of the regions A, B, C in the sidewall portion contains one annular recess so as to have a ratio d/D of 0.29, a test tire 1 in which each of the regions A, B, C in the sidewall portion contains one annular recess so as to have a ratio d/D of 0.30, and a test tire 2 in which each of the regions A, B, C in the sidewall portion contains one annular recess so as to have a ratio d/D of 0.50. Each of these tires had a size of 165 SR13. Each of these tires was inflated under an internal pressure of 1.9 kgf/cm$^2$ and run on a drum at a speed of 150 km/hr under a load of 425 kgf. Under such a condition, the driving of the drum was stopped to rotate the drum by inertia force, during which a deceleration degree of the tire was measured to determine a rolling resistance of each tire at 50 km/hr. As a result, when the rolling resistance was represented by an index on the basis that the conventional tire was 100, it was 99 in the comparative tires 1 and 2, 97 in the test tire 1 and 94 in the test tire 2, so that the rolling resistance was reduced in the tires according to the invention. Moreover, the index value of 100 was actually the rolling resistance of 3.6 kg.

As mentioned above, according to the invention, the strain energy loss can surely be decreased though the tire build up is easy and the production cost is inexpensive.

What is claimed is:

1. A pneumatic radial tire comprising; a pair of bead portions, a pair of sidewall portions substantially extending outward from the bead portions in a radial direction, and a tread portion of substantially cylindrical form connecting radially outward ends of the sidewall portions to each other; and a belt disposed beneath the tread; wherein when said tire is mounted on a normal rim the sidewall portion ranges from a separation point of the tire from said rim to a tread end and is equally divided into three regions, and at least one annular recess extending circumferentially of the tire is formed on an outer surface of each of said regions in the sidewall portion with the annular recesses being spaced at approximately equal intervals and each recess has a maximum depth of at least 0.3 times an original rubber gauge at a position corresponding to a deepest point of the annular recess with the depth of each recess gradually changing in a radial direction of said tire to provide each recess with a smooth gradually curved surface in the radial direction.

2. The pneumatic tire according to claim 1, wherein said maximum depth is not more than 0.7 times of said original rubber gauge.

3. The pneumatic tire according to claim 1, wherein said sidewall portion contains 3 to 6 annular recesses per 10 cm of a distance in radial direction of the tire.

4. The pneumatic tire of claim 1, wherein said recesses are arranged on said sidewall at substantially equal intervals in a radial direction of said tire.

5. The pneumatic tire of claim 1, wherein said sidewall contour has a wavy form.

* * * * *